(12) United States Patent
Sharma et al.

(10) Patent No.: US 12,132,669 B1
(45) Date of Patent: Oct. 29, 2024

(54) RESOURCE ALLOCATION IN SECURE COMPUTATION AND COMMUNICATION

(71) Applicant: Lemon Inc., Grand Cayman (KY)

(72) Inventors: Sagar Sharma, Culver City, CA (US); Qiang Yan, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/317,483

(22) Filed: May 15, 2023

(51) Int. Cl.
*G06F 15/16* (2006.01)
*H04L 41/16* (2022.01)
*H04L 47/80* (2022.01)
*H04L 47/83* (2022.01)

(52) U.S. Cl.
CPC .............. *H04L 47/83* (2022.05); *H04L 41/16* (2013.01); *H04L 47/808* (2013.01)

(58) Field of Classification Search
CPC ........ H04L 47/83; H04L 41/16; H04L 47/808
See application file for complete search history.

(56) References Cited

U.S. PATENT DOCUMENTS

| | | | | |
|---|---|---|---|---|
| 12,010,041 | B1* | 6/2024 | Sharma ................. | H04L 47/822 |
| 2020/0356558 | A1 | 11/2020 | Nerurkar et al. | |
| 2021/0359846 | A1* | 11/2021 | Wright .................. | H04L 9/0643 |
| 2022/0237192 | A1* | 7/2022 | Jiang ...................... | G06F 16/278 |
| 2022/0309386 | A1* | 9/2022 | Barberis ................ | G06N 20/00 |
| 2023/0153573 | A1* | 5/2023 | Principe ................ | G06N 3/084 |
| | | | | 706/15 |
| 2023/0376796 | A1* | 11/2023 | Jacobs ................... | G06N 5/022 |

FOREIGN PATENT DOCUMENTS

| | | |
|---|---|---|
| CN | 113609523 A | 11/2021 |
| CN | 113642715 A | 11/2021 |
| CN | 115811726 A | 3/2023 |

OTHER PUBLICATIONS

McSherry, Frank D. "Privacy integrated queries: an extensible platform for privacy preserving data analysis." Proceedings of the 2009 ACM SIGMOD International Conference on Management of data. 2009.
Johnson, Noah, et al. "Chorus: a programming framework for building scalable differential privacy mechanisms." 2020 IEEE European Symposium on Security and Privacy (EuroS&P). IEEE, 2020, https://arxiv.org/pdf/1809.07750.pdf.

(Continued)

*Primary Examiner* — Oleg Survillo
(74) *Attorney, Agent, or Firm* — HSML P. C.

(57) ABSTRACT

Modelling for efficient resource allocation and/or distribution in secure computation and communication for differential privacy protocols and/or algorithms is provided. A method for allocating a resource of a differentially private system in secure computation and communication includes aggregating attributes from a usage log of the differentially private system for a predetermined period of time, generating a moving aggregation based on the aggregated attributes, training a machine learning model based on the aggregated attributes and the moving aggregation, predicting a distribution of the resource using the trained machine learning model, and allocating the resource based on the predicted distribution. The resource includes a differential privacy parameter.

20 Claims, 4 Drawing Sheets

(56) References Cited

OTHER PUBLICATIONS

Rogers, Ryan, et al. "LinkedIn's Audience Engagements API: A privacy preserving data analytics system at scale." arXiv preprint arXiv:2002.05839 (2020), https://arxiv.org/pdf/2002.05839.pdf.
Wilson, Royce J., et al. "Differentially private SQL with bounded user contribution." Proceedings on privacy enhancing technologies 2020.2 (2020): 230-250, https:/arxiv.org/pdf/1909.01917.pdf.
International Search Report issued in PCT/SG2024/050314, dated Jun. 26, 2024.
Assam et al., "Differential Private Trajectory Protection of Moving Objects" ACM Sigspatial IWGS '12, Nov. 6, 2012, pp. 1-10, Retrieved on Jun. 25, 2024.

* cited by examiner

RESOURCE ALLOCATION IN SECURE COMPUTATION AND COMMUNICATION

FIELD

The embodiments described herein pertain generally to allocating a resource in a secure computation and/or communication. More specifically, the embodiments described herein pertain to modelling for efficient resource allocation and/or distribution in a secure computation and/or communication for differential privacy protocols and/or algorithms.

BACKGROUND

Differential privacy (DP) protocols and algorithms have been used to provide robust data privacy protection. For each interactive query or operation from a data consumer to a dataset, DP protocols and algorithms may provide a certain level of data privacy protection (e.g., referred to as a differential privacy guarantee). A party that owns or hosts the dataset may add or inject noise into its dataset or into the query results of that dataset to achieve a desired level of data privacy protection for DP protocols or algorithms. In a differentially private data access and/or analytics system, efficient privacy budget allocation for data consumers or for queries by a data consumer may be critical to meet various privacy budget needs. The total privacy budget may set an upper bound on overall privacy loss due to a differential change in data, which is a difference in a query result due to the absence or presence of any individual record or user in the underlying dataset. The available privacy budget may also affect the overall utility of results the DP system returns. Existing solutions may set a fixed privacy budget allocation for all data consumers in a group, or a fixed privacy budget for all queries in a data consumer's context.

SUMMARY

In a DP system, a user (e.g., a data consumer, etc.) may use a resource (e.g., DP parameters such as privacy budget, probability, etc.) that is available to execute or perform one or more queries by dividing and allocating the resource available into smaller portions/values e.g., to the queries. Similarly, a group of users or a department having multiple groups may allocate its resource to one or more users. Resource allocation typically requires allocating or distributing the resource to the data consumers or a group of data consumers in the system based on the underlying characteristics (e.g., the frequency of usage of the dataset, the business unit, the business priority, a tolerance level to the noise added to the dataset query results, etc.) of the data consumers or groups or those of the queries (e.g., query components, joins and other transformations, aggregation types, etc.) being executed or performed in the system, to prevent a lack of the resource available to a data consumer or group, wasted in others (e.g., users or groups with a higher number of queries to execute or perform may find the allocated resource insufficient to meet their utility needs, while users or groups with a smaller number of queries may find that the allocated resource is unnecessary). Similarly, users or groups with lower levels of tolerance (to the noise added to the dataset query results) may require more resource than those that may tolerate higher levels of noise.

Features in the embodiments described herein may provide a system for analyzing and modeling usage logs (e.g., query logs, etc.) of a DP system to efficiently allocate resource for different data consumers and/or groups of data consumers. The DP system may generate and store usage logs (e.g., specially designed logs that captures several attributes and/or characteristics of the data consumers and the queries on a query-to-query basis). The usage logs (e.g., query logs, etc.) may be fed into a modeling pipeline that includes data processing, moving averaging (for generating a moving average, which is a term of art in statistics, that captures the average change in a data series over time), and a machine learning model training. The machine learning model may be trained to learn to recommend a suitable resource allocation based on the data consumers' characteristics including the error tolerance level, the operation priority, query attributes such as query result magnitude(s), query sensitivity, etc. In addition to the data consumers' query characteristics or behaviors, the machine learning model may be trained to learn an overall error that the data consumers or groups may receive in the query results and the amount of resource(s) overage or under-usage as a feedback mechanism for training or re-training the machine learning model. Features in the embodiments described herein may reduce overall resource wastage and minimize the overall errors the data consumers and/or the groups may encounter. With a feedback loop in place, the machine learning model may continually improve its recommendations as the DP system operates for longer periods of time.

In one example embodiment, a method for allocating a resource of a differentially private system in secure computation and communication is provided. The resource includes a differential privacy parameter. The method includes aggregating attributes from a usage log of the differentially private system for a predetermined period of time, generating a moving aggregation based on the aggregated attributes, training a machine learning model based on the aggregated attributes and the moving aggregation, predicting a distribution of the resource using the trained machine learning model, and allocating the resource based on the predicted distribution.

In another example embodiment, a secure computation and communication system is provided. The system includes a processor and a memory to store a usage log of a differentially private system. The usage log has a plurality of attributes. The processor is to aggregate the attributes for a predetermined period of time, generate a moving aggregation based on the aggregated attributes, train a machine learning model based on the aggregated attributes and the moving aggregation, predict a distribution of a resource of the differentially private system using the trained machine learning model, and allocate the resource based on the predicted distribution. The resource includes a differential privacy parameter.

In yet another example embodiment, a non-transitory computer-readable medium having computer-executable instructions stored thereon is provided. The instructions, upon execution, cause one or more processors to perform operations including aggregating attributes from a usage log of a differentially private system for a predetermined period of time, generating a moving aggregation based on the aggregated attributes, training a machine learning model based on the aggregated attributes and the moving aggregation, predicting a distribution of a resource of the differentially private system using the trained machine learning model, and allocating the resource based on the predicted distribution. The resource includes a differential privacy parameter.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
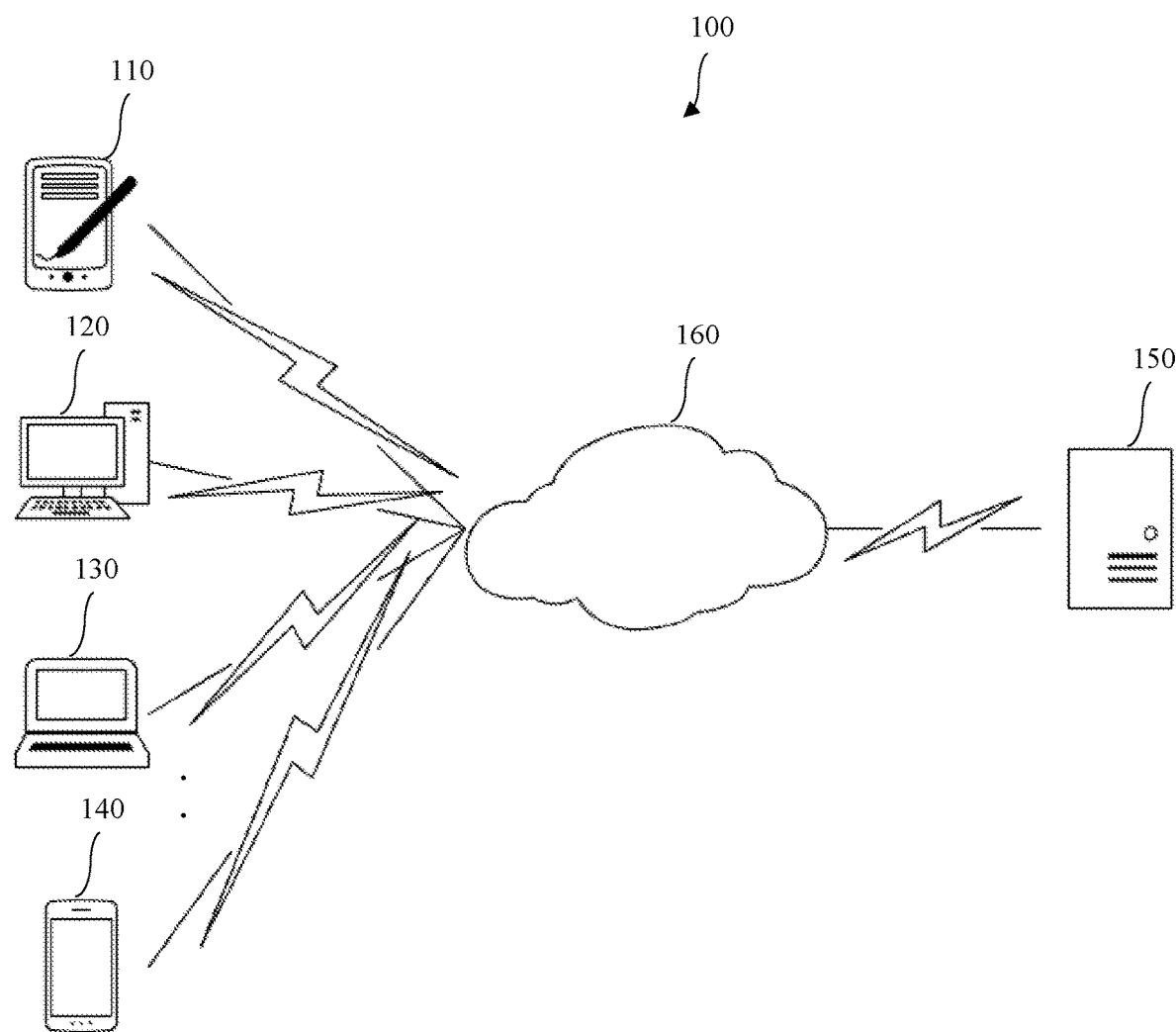
FIG. 1 is a schematic view of an example secure computation and communication system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "differential privacy" or "DP" is a term of art and may refer to a standard, a protocol, a system, and/or an algorithm for publicly sharing information regarding a dataset by describing patterns of groups of elements within the dataset while withholding information about individual users to whom elements or records within the dataset correspond. It is to be understood that differential privacy may refer to a constraint on algorithms used to release aggregate information about a statistical dataset or database to a user (e.g., a data consumer, etc.), which limits the disclosure of private information of records for individuals whose information is in the dataset or database.

The following is a non-limiting example of the context, setting, or application of differential privacy. A trusted data owner (or data holder or curator, such as a social media platform, a website, a service provider, an application, etc.) may have stored a dataset of sensitive information about individuals (e.g., the dataset includes records/rows of individuals). Each time the dataset is queried (or operated, e.g. analyzed, processed, used, stored, shared, accessed, etc.), there may be a chance or possibility of an individual's privacy being compromised (e.g., probability of data privacy leakage or privacy loss). Differential privacy may provide a rigorous framework and security definition for algorithms that operate on sensitive data and publish aggregate statistics to prevent an individual's privacy from being compromised by, e.g., resisting linkage attacks and auxiliary information, and/or supplying a limit on a quantifiable measure of harm (privacy leakage, privacy loss, etc.) incurred by individual record(s) of the dataset.

It is to be understood that the above requirement of the differential privacy protocol or algorithm may refer to a measure of "how much data privacy is afforded (e.g., by a single query or operation on the input dataset) when performing the operations or functions?" A DP parameter "$\epsilon$" (a unit-less parameter) may refer to a privacy budget (i.e., a limit of how much data privacy it is acceptable with leaking), e.g., indicating a maximum difference between a query or operation on dataset A and the same query or operation on dataset A' (that differs from A by one element or record). The smaller the value of $\epsilon$ is, the stronger the privacy protection is for the multi-identification privacy-protection mechanism. Another DP parameter "$\delta$" (a unit-less parameter) may refer to a probability, such as a probability of information being accidentally leaked. In an example embodiment, a required or predetermined numeric value of $\epsilon$ may range from at or about 1 to at or about 3. The required or predetermined numeric value of $\delta$ may range from at or about 10-10 (or at about 10-8) to at or about 10-6. Yet another DP parameter sensitivity (a unit-less parameter) may refer to a quantified amount for how much noise perturbation may be required in the DP protocol or algorithm. It is to be understood that to determine the sensitivity, a maximum of possible change in the result may need to be determined. That is, sensitivity may refer to an impact a change in the underlying dataset may have on the result of the query to the dataset.

As referenced herein, "differential privacy composition" or "DP composition" is a term of art and may refer to the total or overall differential privacy when querying (or operating, e.g., analyzing, processing, using, storing, sharing, accessing, etc.) a particular dataset more than once. DP composition is to quantify the overall differential privacy (which may be degraded in view of the DP of a single query or operation) when multiple separate queries or operations are performed on a single dataset. It is to be understood that when a single query or operation to the dataset has a privacy loss L, the cumulative impact of N queries (referred to as N-fold composition or N-fold DP composition) on data privacy may be greater than L but may be lower than L*N. In an example embodiment, the number N may be at or about 10, at or about 25, or any other suitable number. In an example embodiment, $\epsilon$, $\delta$, sensitivity, and/or the number N may be predetermined to achieve a desired or predetermined data privacy protection goal or performance.

It is to be understood that the differential privacy requirements may be achieved via adding or injecting noise into the dataset studiously to form data anonymous, which may allow data consumers to execute all possible or useful statistical analysis on the dataset without identifying any personal information. It is also to be understood that adding controlled noise from a predetermined distributions (binomial distribution, Laplace distribution, normal/Gaussian distribution, etc.) may be a way of designing differentially private algorithms. It is further to be understood that adding noise may be useful for designing private protection mechanisms for real-valued functions on sensitive data.

It is also to be understood that when the differential privacy requirements ($\epsilon$, $\delta$, sensitivity, etc.) are met or achieved, a dataset operation (e.g., dataset access, dataset query, etc.) may be deemed as random and/or differentially private, making it almost impossible for an attacker to determine a user's record(s) and/or an individual record in the dataset. The dataset operations in the embodiments described herein may guarantee being differentially private (e.g., being ($\epsilon$, $\delta$)-differentially private, etc.). In an example embodiment, the dataset operations are deemed as "($\epsilon$, $\delta$)-differentially private" (i.e., differentially private based on the $\epsilon$ and $\delta$), if for any pair of (A, A') and every measurable set E in all potential output of M (a privacy-protection mechanism, such as a randomized algorithm, etc.) that may be predicted, the probability of (M(A)$\in$E) is less than or equal to e$\epsilon$×the probability of (M(A')$\in$E)+$\delta$, where $\epsilon$ is the Euler's number. The dataset operations in the embodiments described herein may be "($\epsilon$, $\delta$)-differentially private" for the provided $\epsilon$ and $\delta$.

It is further to be understood that a party that owns or hosts the dataset may add or inject noise into its dataset or into the query results of that dataset to achieve a desired level of data privacy protection for DP protocols or algorithms. As referenced herein, "error" or "error" of the noise results may refer to a difference between the real results and the noisy results (i.e., results having noise for DP data privacy protection) of the dataset operation. It is to be understood that error may be measured by error type. Error type may refer to a tunable parameter (e.g., a mean relative error type, a median relative error type, a root mean squared error type, etc.). That is, error may refer to a difference between the real results and the noisy results measured by a selected or predetermined error type.

As referenced herein, a "model" may refer to software, such as algorithms and/or programs, hardware or firmware, or any combination thereof that supports machine learning, natural language understanding, natural language processing, speech recognition, computer vision, etc.

As referenced herein, "machine learning" may refer to a (learned or trained) computer or processor-related technology by which decisions and/or actions are autonomously made, in place of human intervention. It is to be understood that machine learning may refer to software, i.e., algorithms and/or programs, hardware or firmware, or any combination thereof that supports natural language understanding and/or processing, speech recognition, computer vision, etc. Also included among the range of machine learning functions and capabilities, and pertinent to the embodiments disclosed, recited, and suggested herein, are model training and model usage (inference, prediction, etc.).

FIG. 1 is a schematic view of an example secure computation and communication system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping services, dataset operation services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
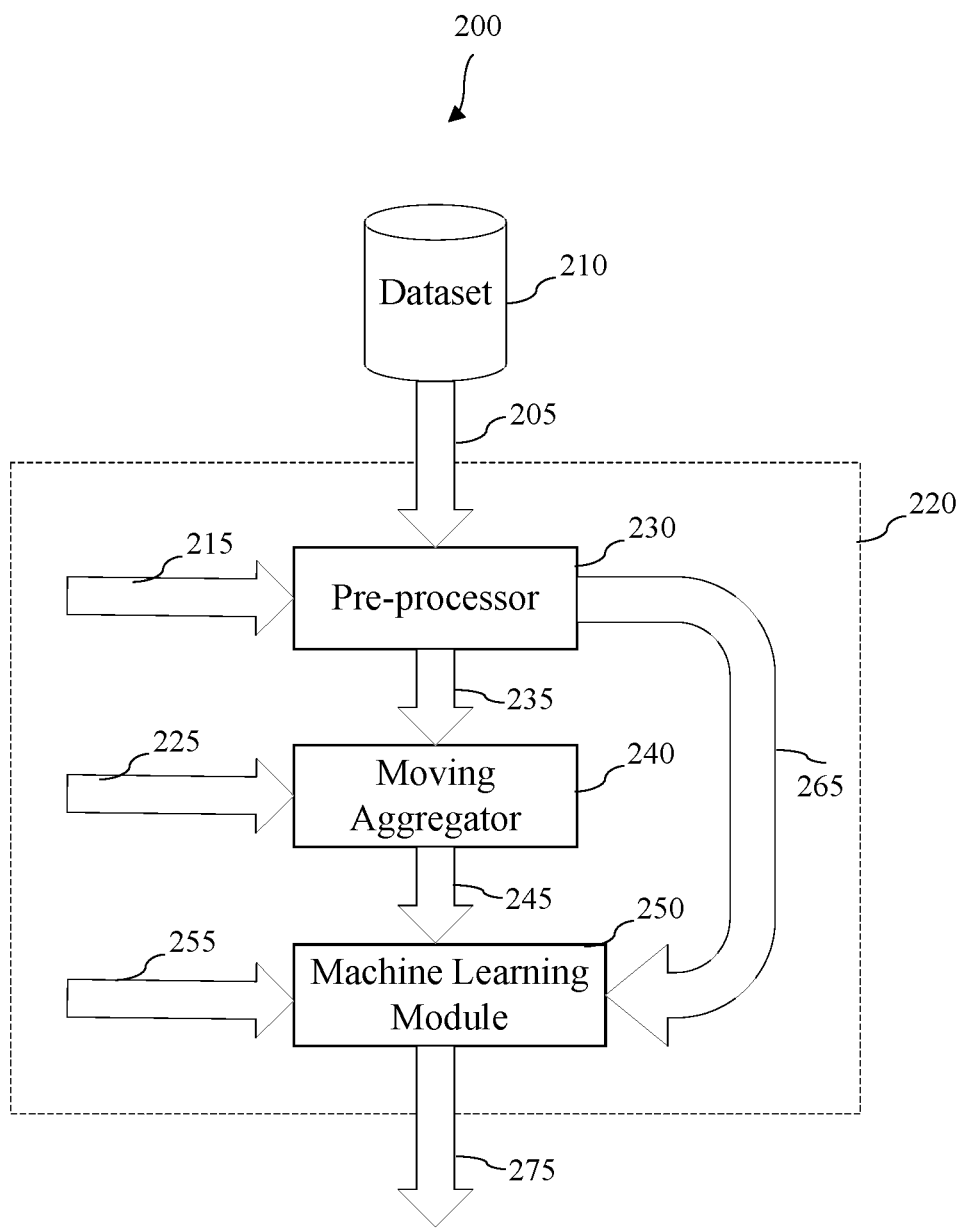
FIG. 2 is a schematic view of an example resource allocation system, arranged in accordance with at least some embodiments described herein.

FIG. 2 is a schematic view of an example resource allocation system 200, arranged in accordance with at least some embodiments described herein.

In an example embodiment, the system 200 may be a differentially private dataset access and/or analytics system. The system 200 includes a dataset 210 and a resource predictor 220. Operations (e.g., access, query, etc.) with regard to data elements or records stored in the dataset 210, individually or collectively, may be differentially private. That is, users to whom elements or records within the dataset 210 correspond may be protected by executing differential privacy (DP) protocols or algorithms.

In an example embodiment, information regarding operations (e.g., access, query, etc.) on the dataset 210 may be recorded or stored as a usage log 205 (e.g., a data consumer audit log, a DP system usage log, etc.), which may include a plurality of attributes with respect to the operations on the dataset 210 by the data consumer.

In an example embodiment, the attributes in the usage log 205 may include a timestamp recording the time when the operation (e.g., access, query, etc.) on the dataset 210 performed by a device corresponding to the data consumer occurs. The attributes may also include an identification of e.g., the operation, the data consumer, and/or a group of data consumers. The attributes may further include the business unit with which and/or for which the data consumer and/or group is conducting a transaction or business. Also the attributes may include an aggregation function in the query and its sensitivity parameter. The attributes may further include DP parameters such as $\epsilon$ (epsilon, privacy budget) used by e.g., the operation, the data consumer, and/or the group; and/or $\delta$ (delta, probability of information being accidentally leaked) used by e.g., the operation, the data consumer, and/or the group. Also the attributes may include error, which may include, in an example embodiment, error of the noise results that indicate how far real dataset operation (access, query, etc.) results are from the noisy results (results having noise for DP data privacy protection).

In an example embodiment, the error may be determined based on e.g., a predetermined or selected error-type, which may include e.g., a mean relative error type, a median relative error type, a root mean squared error type, etc. In an example embodiment, the attributes in the usage log 205 may include one or more of the join operations and/or group-by operations contained in the query, clipping of values (to be described below), truncation of users' contributions (to be described below), query result magnitudes, the users' tolerance for error, the priority of the query, etc. It is to be understood that the attributes in the usage log 205 may include one or more of the attributes described above and/or any other suitable attributes with respect to the operations on the dataset 210 by the data consumer.

As set forth above, in an example embodiment, the system 200 may include a resource predictor 220. The resource may be e.g., the total and/or available $\epsilon$, $\delta$, or any other suitable resource of the DP system with respect to e.g., operations of the dataset 210 in e.g., a predetermined period of time. The predictor 220 includes a pre-processor 230, a moving aggregator 240 and a machine learning module 250. The pre-processor 230 may receive or obtain the usage log 205 as an input, and receive or obtain the input 215.

In an example embodiment, the input 215 may include a target duration unit (TDU), which may be a predetermined duration of time (e.g., a day, a week, a month, etc.) for which the resource is to be allocated. In an example embodiment, the input 215 may also include an aggregation type. It is to be understood that an aggregation of the attributes of the dataset 210 may include statistics (counts, summary, average, etc.) of the attributes. In an example embodiment, the aggregation type can be a counts type, a summary type, an average type, etc. It is to be understood that each element of the input 215 may be predetermined, entered or selected by a user via a user interface, etc.

In an example embodiment, the pre-processor 230 may receive or obtain the attributes of the usage log 205 and the input 215 as inputs. The pre-processor 230 may e.g., aggregate the attribute(s) of the usage log 205 per the input TDU (e.g., a day, a week, a month, etc. for which the resource, such as the privacy budget $\epsilon$, etc., is to be predicted) for the data consumer or for a group of data consumers.

It is to be understood that in an example embodiment, $\epsilon$ (epsilon, privacy budget) may refer to a DP parameter known as, e.g., a privacy loss that occurs with inclusion or exclusion of a record from the underlying dataset. It is to be understood that $\epsilon$ may be adjusted to balance privacy versus utility. Data utility may indicate how useful the data (or the dataset containing the data) is in view of the noise added to the data for privacy protection. For example, if the privacy budget $\epsilon$ is too small, using differential privacy may lead to poor data utility because too much noise may be added to the data rendering the data less useful or completely useless. If the privacy budget $\epsilon$ is too large, the use of differential privacy may lead to privacy leakage.

It is also to be understood that in an example embodiment, δ (delta) may refer to an approximate DP parameter that determines the probability of information accidentally being leaked independent of ϵ. In an example embodiment, δ may be set to 1/size-of-dataset (e.g., the number of records/rows in the dataset). δ may affect data utility in certain ranges. $E_{type}$ may refer to a tunable parameter for error type (e.g., a mean relative error type, a median relative error type, a root mean squared error type, etc.) "Error" may refer to a difference between the results and the noisy results using the selected or predetermined $E_{type}$. For example, "Error" or "E" may indicate how far the real dataset operation (access, query, etc.) results are from the noisy results (results having noise for DP data privacy protection). Clipping may refer to a maximum value an attribute of the usage log 205 may take for DP sensitivity and noise control purposes. Truncation may refer to a maximum number of contributions from a user or record in the underlying dataset.

In an example embodiment, the pre-processor 230 may aggregate the attributes of the usage log 205 for the TDU at a data consumer level. For example, the pre-processor 230 may aggregate the attributes and generate e.g., the total sensitivity used by a data consumer per day, the average total error for a data consumer per day, etc.

In an example embodiment, the pre-processor 230 may process the usage log 205 to aggregate (e.g., generate statistics such as counts, sum, and/or averages) on the selected attributes e.g., per data consumer or per group for the TDU for which the resource (ϵ, δ, etc.) is set for, and generate output 235 and/or output 265. The aggregation (in the output 235 and/or output 265) may include one or more of the TDU (e.g., the day, etc.); the identification of e.g., the operation, the data consumer, and/or a group of data consumers including the data consumer; the total number of operations (accesses, queries, etc.); the total sensitivity of these operations (accesses, queries, etc.); the number of join operations and/or group-by operations contained in the query; the average clipping value; the average truncation value; the average query result magnitude; the average priority of the query; the average tolerance to error, the average total error; the total ϵ used by e.g., the operation, the data consumer, and/or the group; the total δ used by e.g., the operation, the data consumer, and/or the group; the total ϵ predicted/recommended for e.g., the operation, the data consumer, and/or the group; and/or the total δ predicted/recommended for e.g., the operation, the data consumer, and/or the group. It is to be understood that the aggregation may include any suitable aggregation of other attributes in the usage log 205.

It is to be understood that for the first iteration of a process (e.g., at the initialization phase of the process, etc.), the predicted or recommended resource such as the predicted or recommended ϵ and/or δ (in the output 235 and/or output 265) are fixed or static to begin with each data consumer or group being assigned the same or fixed amount of the resource (e.g., ϵ, δ, etc.). It is also to be understood that other statistics (median, standard deviation, etc.) of the user attributes in the usage log 205 other than count, sum, or averages may be used. In an example embodiment, the output 235 and the output 265 are a same output, fed to the moving aggregator 240 and the machine learning module 250, respectively.

In an example embodiment, the moving aggregator 240 may receive or obtain the output 235 of the pre-processor 230 as an input, receive or obtain the input 225, and generate a moving aggregation as the output 245. The input 225 may include a window size "k," which may indicate how many TDUs are to be considered for a moving aggregation. For example, if the TDU is a day, the window size k is 7, and an aggregation for each day may be determined or generated, then a 7-day moving aggregation (aggregation for each of the past 7 days) of the attribute(s) of the usage log 205 may be determined or generated by the moving aggregator 240. The input 225 may also include a seasonality of e.g., the TDU or the window size of the TDU. For example, the seasonality may indicate e.g., the last or past k Monday, the last or past k March, a certain weighted values for months, quarters, years, etc. The moving aggregator 240 may allow for configuring the window size (k) and any seasonality that may be considered. It is to be understood that each element of the input 225 may be predetermined, entered or selected by a user via a user interface, etc.

In an example embodiment, the moving aggregator 240 may generate a moving aggregation (the output 245) of the attributes e.g., based on the aggregated attributes. For example, the moving aggregator 240 may generate moving averages of the attributes from the aggregated attributes, and the moving averages may be taken from the data/attributes from the past k (e.g., 7, etc.) TDUs (e.g., days). The output 245 may include e.g., a moving aggregation (e.g., a moving average or other moving statistics) of attributes in the usage log 205 over a sliding or moving window of time e.g., a number k of TDUs. It is to be understood that the moving aggregation may be a moving weighted average, a standard moving median, a moving quantile, a moving standard deviation, etc. For example, the output 245 may be a windowed moving aggregation of the attribute(s), e.g., simple moving averages of the attribute(s) per query, per data consumer, or per group for the past k (e.g., 7, etc.) days.

In an example embodiment, the aggregation (in the output 245) may include one or more of the TDU (e.g., the day, etc.); the identification of e.g., the operation, the data consumer, and/or a group of data consumers including the data consumer; the average number of operations (accesses, queries, etc.); the average sensitivity of these operations (accesses, queries, etc.); the average number of joins and/or group-by operations contained in the query; the average clipping value; the average truncation value; the average query result magnitude; the average priority of the query; the average tolerance to error, the average total error; the average total ϵ used by e.g., the operation, the data consumer, and/or the group; and/or the average total δ used by e.g., the operation, the data consumer, and/or the group. It is to be understood that the aggregation may include any suitable aggregation of other attributes in the usage log 205.

It is also to be understood that for any additional or new TDU (e.g., the k+1 TDU), the moving aggregator 240 may determine or project an average total ϵ used and an average total δ used for a data consumer based on the ϵ used and the δ used in the past k TDUs. The average total ϵ used and the average total δ used may be used (e.g., by the pre-processor 230 in next iteration, see description of the process iterations in FIG. 3) as the recommended ϵ and δ values (total predicted/recommended moving average ϵ, the total predicted/recommended moving average δ) for the data consumer or the group for the new TDU, therefore replacing the fixed or static values for the total ϵ predicted/recommended and the total δ predicted/recommended in the output 235 and/or the output 265.

In an example embodiment, the machine learning module 250 may receive or obtain the output 245, the input 255, and/or the output 265 as inputs. It is to be understood that each element of the input 255 may be predetermined, entered or selected by a user via a user interface, etc. The machine learning module 250 may generate (e.g., by modeling the attributes in the usage log) a machine learning model (e.g., a machine learning regression model such as a random forest regressor, etc.).

In an example embodiment, the machine learning module 250 may train the machine learning model ("model") using training data x-train based on e.g., the process data per TPU (e.g., on the daily processed data), which may be from the output 245 and/or the output 265, and/or using training data y-train, which is the training data with the target attribute $\epsilon$, $\delta$, or both $\epsilon$ and $\delta$, which are the parameters or resources the system is to recommend or predict.

In an example embodiment, the x-train data may include the date (e.g., day of the week month of the year, etc.); the identification of e.g., the operation, the data consumer, and/or a group of data consumers including the data consumer; the total number of operations (accesses, queries, etc.); the total sensitivity of these operations (accesses, queries, etc.); the number of joins and/or group-by operations contained in the query; the average clipping value; the average truncation value; the average query result magnitude; the average priority of the query; the average tolerance to error, the average total error; the total predicted/recommended moving average $\epsilon$ for e.g., the operation, the data consumer, and/or the group; the total predicted/recommended moving average $\delta$ for e.g., the operation, the data consumer, and/or the group; the total predicted/recommended machine learning $\epsilon$ for e.g., the operation, the data consumer, and/or the group; the total predicted/recommended machine learning $\delta$ for e.g., the operation, the data consumer, and/or the group; etc. It is to be understood that the x-train data may include any suitable elements or aggregations in the output 245 and/or output 265.

In an example embodiment, the y-train data may include the total $\epsilon$ used for e.g., the operation, the data consumer, and/or the group; the total $\delta$ used for e.g., the operation, the data consumer, and/or the group; or the total $\epsilon$ used and the total $\delta$ used for e.g., the operation, the data consumer, and/or the group.

In an example embodiment, the model may be a single target regression model (e.g., random forest regressor, etc.) to predict either the total $\epsilon$ used or the total $\delta$ used for e.g., the operation, the data consumer, and/or the group, and to predict one value ($\epsilon$ or $\delta$) at a time. In an example embodiment, the model may be a multi target regression model (e.g., multioutput support vector regression, etc.) to predict both the $\epsilon$ and $\delta$ values at the same time.

It is to be understood that in the x-train data, the total predicted/recommended machine learning $\epsilon$ may be set as the total predicted/recommended moving average $\epsilon$, and the total predicted/recommended machine learning $\delta$ may be set as the total predicted/recommended moving average $\delta$ until the machine learning module outputs are available. Such setting or configuration may be served as a feedback loop (e.g., to retrain the model, etc.) to signal to the model being trained whether the training of the model is functioning and also helps the training to improve over time as the machine learning module outputs become available.

In an example embodiment, after the model is trained, the model may be deployed. The machine learning module 250 may use the model to predict or infer the recommended $\epsilon$, or $\delta$ or both (i.e., to generate the output 275 containing the recommended resource ($\epsilon$, or $\delta$, or both, etc.)).

In an example embodiment, when the machine learning module 250 trains the model or uses the trained model to predict or infer the recommended resource allocation, the machine learning module 250 may obtain or receive an input 255. It is to be understood that each element of the input 255 may be predetermined, entered or selected by a data consumer or a group via a user interface, etc. The input 255 may be a planned or predetermined set of attributes M directly entered or selected (e.g., via a user interface) by the data consumer or by the group. The inference of the machine learning module 250 may happen with the set of attributes M being fed into the machine learning module 250.

In another example embodiment, when the machine learning module 250 trains the model or uses the trained model to predict or infer the recommended resource allocation, the machine learning module 250 may obtain or receive the set of attributes M (e.g., from the output 245 from the moving aggregator 240 and/or from the output 265 from the preprocessor 230). The inference of the machine learning module 250 may be made with the set of attributes M being fed into the machine learning module 250.

In an example embodiment, the set of attributes M may include one or more of the total number of operations (accesses, queries, etc.); the total sensitivity of these operations (accesses, queries, etc.); the number of joins and/or group-by operations contained in the query; the average clipping value; the average truncation value; the average query result magnitude; the average tolerance to error, the average total error; the total predicted/recommended moving average $\epsilon$ for e.g., the operation, the data consumer, and/or the group; the total predicted/recommended moving average $\delta$ for e.g., the operation, the data consumer, and/or the group; the total predicted/recommended machine learning $\epsilon$ for e.g., the operation, the data consumer, and/or the group; the total predicted/recommended machine learning $\delta$ for e.g., the operation, the data consumer, and/or the group; etc. It is to be understood that the set of attributes M may include any other suitable elements or aggregations (e.g., from the output 245 and/or output 265, inputted from the data consumer or group, etc.).

In an example embodiment, the resource (privacy budget $\epsilon$, probability $\delta$, etc.) predicted or recommended (i.e., the output 275) by the machine learning module 250 may be fed back to the training of the model to retrain the model and/or to account for or to learn overall system error. It is to be understood that the prediction (inference, recommendation) of the resource ($\epsilon$, $\delta$, etc.) may be performed for a data consumer, for a group having multiple data consumers, for a department having multiple groups, or for one or more operations (accesses, queries, etc.) where the DP system recommends or predicts a resource ($\epsilon$, $\delta$, etc.) to each operation (access, query, etc.) depending on the operation characteristics.

Figure 3:
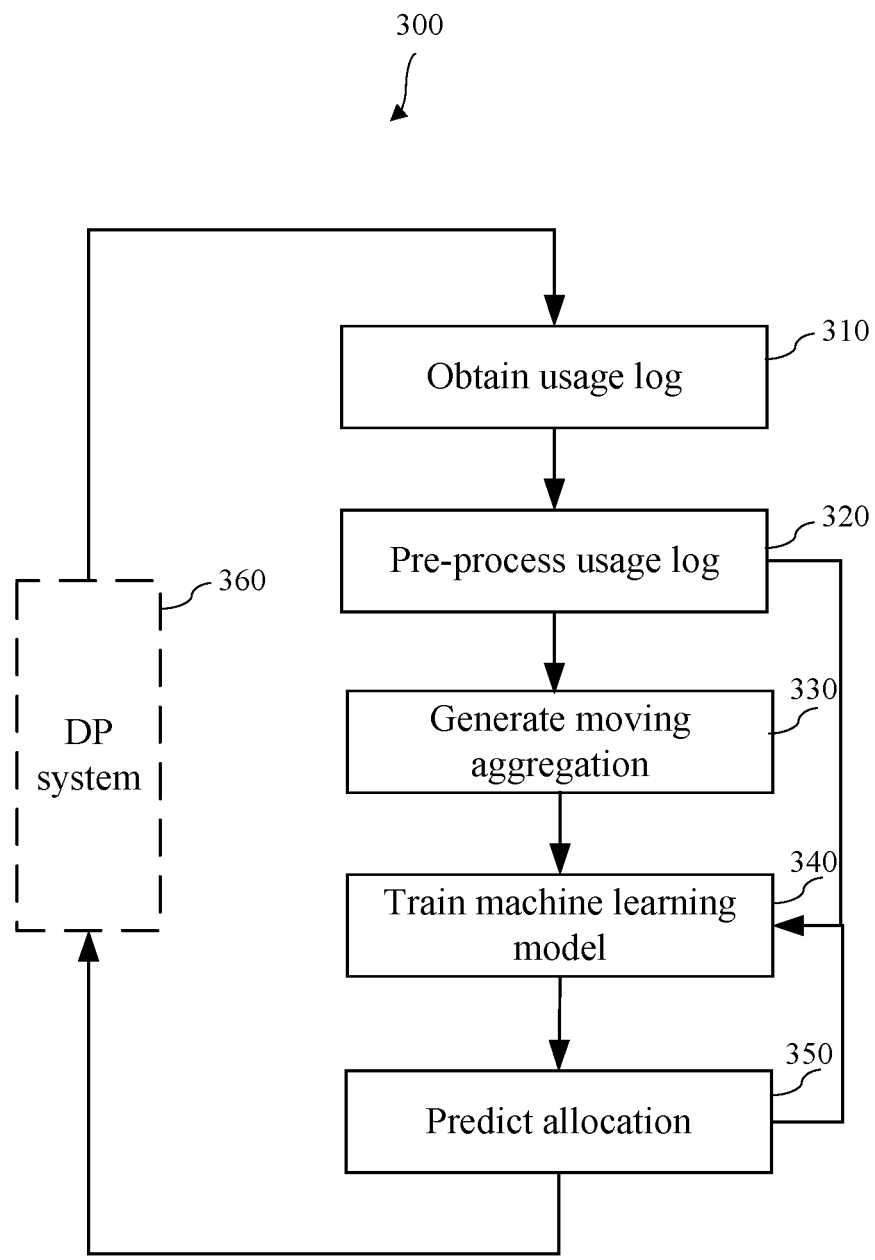
FIG. 3 is a flow chart illustrating an example processing flow for modelling for efficient resource allocation and/or distribution, in accordance with at least some embodiments described herein.

FIG. 3 is a flow chart illustrating an example processing flow 300 for modelling for efficient resource ($\epsilon$, $\delta$, etc.) allocation and/or distribution in secure computation and/or communication, in accordance with at least some embodiments described herein. It is to be understood that the processing flow 300 may include a processor performing the steps and/or operations described in FIG. 2.

Figure 4:
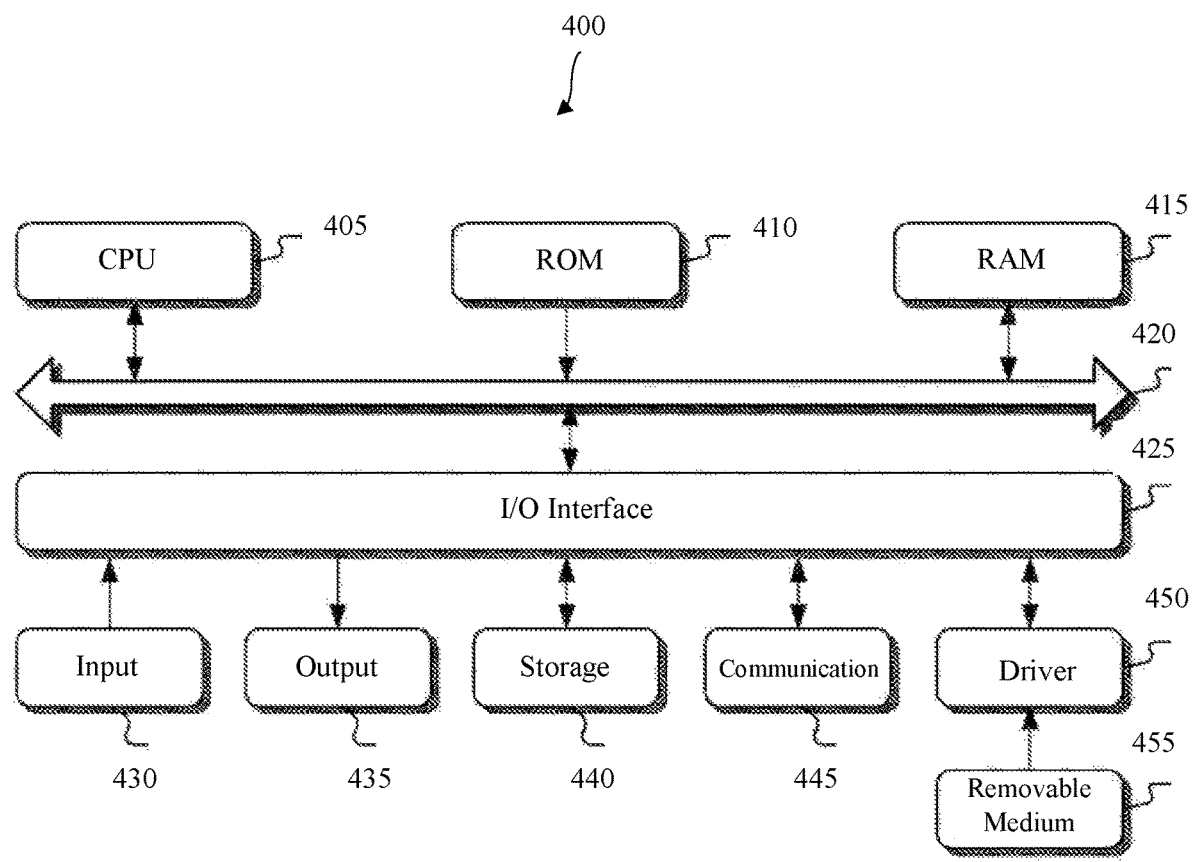
FIG. 4 is a schematic structural diagram of an example computer system applicable to implementing an electronic device, arranged in accordance with at least some embodiments described herein.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 405 of FIG. 4, and/or any other suitable processor), unless otherwise specified.

It is also to be understood that the processing flow 300 can include one or more operations, actions, or functions as illustrated by one or more of blocks 310, 320, 330, 340, and 350. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized. For example, the resource ($\epsilon$, $\delta$, etc.) may be allocated to operations (accesses, queries, etc.), to data consumers, to a group or groups, etc. based on e.g., any suitable allocation scheme (e.g., a fixed allocation, etc.). It is to be understood that the processor may perform and/or execute the steps, functions, and/or operations of the predictor 220, the pre-processor 230, the moving aggregator 240, and/or the machine learning module 250 of FIG. 2. Processing flow 300 may begin at block 310.

At block 310 (Obtain usage log), the processor may obtain or receive a usage log (e.g., 205 of FIG. 2) e.g., from the DP system 360, the data consumer, etc. In an example embodiment, the processor may parse the usage log to retrieve attributes (see the description of the usage log 205 in FIG. 2) from the usage log. Processing may proceed from block 310 to block 320.

At block 320 (Pre-process usage log), the processor may aggregate the attributes for the TDU. See the description of the pre-processor 230 in FIG. 2. Processing may proceed from block 320 to block 330.

At block 330 (Generate moving aggregation), the processor may generate a moving aggregation for the attributes for a window size (e.g., k) of TDUs. See the description of the moving aggregator 240 in FIG. 2. Processing may proceed from block 330 to block 340.

At block 340 (Train machine learning model), the processor may train or retrain a machine learning model (e.g., a machine learning regression model, etc.) using training data based on e.g., the output from the pre-processor 230 and/or the output from the moving aggregator 240. The processor may also train or retrain the machine learning model using training data based on the predicted or recommended resource ($\epsilon$, $\delta$, etc.), which is the output of the machine learning module 250 being fed back to the machine learning module 250. See the description of the machine learning module 250 in FIG. 2. Processing may proceed from block 340 to block 350.

At block 350 (Predict allocation), the processor may use the trained model to predict or infer the recommended resource (e.g., $\epsilon$, $\delta$, etc.) for operations (accesses, queries, etc.), for data consumers, for a group or groups, etc. In an example embodiment, the processor may allocate the predicted or recommended resource ($\epsilon$, $\delta$, etc.) to e.g., the DP system, the operation (access, query, etc.), the data consumer, the group, etc. See the description of the machine learning module 250 in FIG. 2. Processing may proceed from block 350 to back block 310.

It is to be understood that the predicted resource ($\epsilon$, $\delta$, etc.) at block 350 may be fed into the DP system 360 as new allocation, and the processor may continuously obtain or receive the usage log (e.g., 205 of FIG. 2) from the DP system 360 and/or the data consumers, which is generated based on the newly allocated resource ($\epsilon$, $\delta$, etc.). The allocated resource ($\epsilon$, $\delta$, etc.) may be received and/or used by the DP system, the data consumer, etc., as the DP parameters for the next or subsequent operation (e.g., access, query, etc.) on the dataset 210, and new or continuous usage log may be generated based on the newly allocated resource ($\epsilon$, $\delta$, etc.).

It is also to be understood that the predicted resource ($\epsilon$, $\delta$, etc.) at block 350 may be fed into block 340 as feedback, e.g., to retrain the model, to account for (or learn) the overall system error, etc. The processes of blocks 310, 320, 330, 340, and 350 may be repeated for continuous improvement of resource prediction or for continuous resource allocation.

It is to be understood that the features in the embodiments described herein may provide a data consumer or group behavior modeling protocol or algorithm in a DP system with a machine learning algorithm that may predict or recommend resource ($\epsilon$, $\delta$, etc.) for a data consumer, a group having multiple data consumers, or a department having multiple groups.

It is also to be understood that the features in the embodiments described herein may provide a data consumer or group behavior modeling protocol or algorithm in a DP system with a machine learning algorithm that may predict or recommend resource ($\epsilon$, $\delta$, etc.) for a particular operation (e.g., an access, a query, etc.). The features in the embodiments described herein may also provide user interaction(s) with the DP system on receiving recommendation on the resource (e.g., total privacy budget allowance, $\delta$, etc.) for a configurable period of time.

FIG. 4 is a schematic structural diagram of an example computer system 400 applicable to implementing an electronic device (for example, the server or one of the terminal devices shown in FIG. 1), arranged in accordance with at least some embodiments described herein. It is to be understood that the computer system shown in FIG. 4 is provided for illustration only instead of limiting the functions and applications of the embodiments described herein.

As depicted, the computer system 400 may include a central processing unit (CPU) 405. The CPU 405 may perform various operations and processing based on programs stored in a read-only memory (ROM) 410 or programs loaded from a storage device 440 to a random-access memory (RAM) 415. The RAM 415 may also store various data and programs required for operations of the system 400. The CPU 405, the ROM 410, and the RAM 415 may be connected to each other via a bus 420. An input/output (I/O) interface 425 may also be connected to the bus 420.

The components connected to the I/O interface 425 may further include an input device 430 including a keyboard, a mouse, a digital pen, a drawing pad, or the like; an output device 435 including a display such as a liquid crystal display (LCD), a speaker, or the like; a storage device 440 including a hard disk or the like; and a communication device 445 including a network interface card such as a LAN card, a modem, or the like. The communication device 445 may perform communication processing via a network such as the Internet, a WAN, a LAN, a LIN, a cloud, etc. In an embodiment, a driver 450 may also be connected to the I/O interface 425. A removable medium 455 such as a magnetic disk, an optical disk, a magneto-optical disk, a semiconductor memory, or the like may be mounted on the driver 450 as desired, such that a computer program read from the removable medium 455 may be installed in the storage device 440.

It is to be understood that the processes described with reference to the flowchart of FIG. 3 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 445, and/or may be installed from the removable medium 455. The computer program, when being executed by the central processing unit (CPU) 405, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of aspects can be combined with each other.

Aspect 1. A method for allocating a resource of a differentially private system in secure computation and communication, the resource including a differential privacy parameter, the method comprising: aggregating attributes from a usage log of the differentially private system for a predetermined period of time; generating a moving aggregation based on the aggregated attributes; training a machine learning model based on the aggregated attributes and the moving aggregation; predicting a distribution of the resource using the trained machine learning model; and allocating the resource based on the predicted distribution.

Aspect 2. The method of aspect 1, wherein the predicting of the distribution includes predicting the distribution of the resource for a user, a group of users, or a department having a plurality of groups.

Aspect 3. The method of aspect 1, wherein the predicting of the distribution includes predicting the distribution of the resource for a query of a user.

Aspect 4. The method of any one of aspects 1-3, wherein the machine learning model is a single target regression model.

Aspect 5. The method of any one of aspects 1-3, wherein the machine learning model is a multi-target regression model.

Aspect 6. The method of any one of aspects 1-5, further comprising: feeding the predicted distribution of the resource into the machine learning model.

Aspect 7. The method of any one of aspects 1-5, further comprising: feeding a predetermined distribution of the resource into the machine learning model.

Aspect 8. A secure computation and communication system, the system comprising: a memory to store a usage log of a differentially private system, the usage log having a plurality of attributes; a processor to: aggregate the attributes for a predetermined period of time; generate a moving aggregation based on the aggregated attributes; train a machine learning model based on the aggregated attributes and the moving aggregation; predict a distribution of a resource of the differentially private system using the trained machine learning model, the resource including a differential privacy parameter; and allocate the resource based on the predicted distribution.

Aspect 9. The system of aspect 8, wherein the processor is to further: predict the distribution of the resource for a user, a group of users, or a department having a plurality of groups.

Aspect 10. The system of aspect 8, wherein the processor is to further: predict the distribution of the resource for a query of a user.

Aspect 11. The system of any one of aspects 8-10, wherein the machine learning model is a single target regression model.

Aspect 12. The system of any one of aspects 8-10, wherein the machine learning model is a multi-target regression model.

Aspect 13. The system of any one of aspects 8-12, wherein the processor is to further: feed the predicted distribution of the resource into the machine learning model.

Aspect 14. The system of any one of aspects 8-12, wherein the processor is to further: feed a predetermined distribution of the resource into the machine learning model.

Aspect 15. A non-transitory computer-readable medium having computer-executable instructions stored thereon that, upon execution, cause one or more processors to perform operations comprising: aggregating attributes from a usage log of a differentially private system for a predetermined period of time; generating a moving aggregation based on the aggregated attributes; training a machine learning model based on the aggregated attributes and the moving aggregation; predicting a distribution of a resource of the differentially private system using the trained machine learning model, the resource including a differential privacy parameter; and allocating the resource based on the predicted distribution.

Aspect 16. The computer-readable medium of aspect 15, wherein the predicting of the distribution includes predicting the distribution of the resource for a user, a group of users, or a department having a plurality of groups.

Aspect 17. The computer-readable medium of aspect 15, wherein the predicting of the distribution includes predicting the distribution of the resource for a query of a user.

Aspect 18. The computer-readable medium of any one of aspects 15-17, wherein the machine learning model is a single target regression model or a multi-target regression model.

Aspect 19. The computer-readable medium of any one of aspects 15-18, wherein the operations further comprise: feeding the predicted distribution of the resource into the machine learning model.

Aspect 20. The computer-readable medium of any one of aspects 15-18, wherein the operations further comprise: feeding a predetermined distribution of the resource into the machine learning model.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for allocating a resource of a differentially private system in secure computation and communication, the method comprising:
    providing a usage log including operation information of the differentially private system, the differentially private system having a privacy budget parameter indicative of a strength of a data privacy protection and a probability parameter indicative of a data privacy loss;
    aggregating attributes from the usage log of the differentially private system for a predetermined period of time, the privacy budget parameter and the probability parameter forming at least a part of the attributes;
    generating a windowed moving aggregation based on the aggregated attributes;
    training a machine learning model based on the aggregated attributes and the windowed moving aggregation to minimize an overall error of an attribute of the attributes;
    predicting a distribution of the resource using the trained machine learning model; and
    allocating the resource based on the predicted distribution.

2. The method of claim 1, wherein the predicting of the distribution includes predicting the distribution of the resource for a user, a group of users, or a department having a plurality of groups.

3. The method of claim 1, wherein the predicting of the distribution includes predicting the distribution of the resource for a query of a user.

4. The method of claim 1, wherein the machine learning model is a single target regression model or a multi-target regression model.

5. The method of claim 1, further comprising:
    feeding the predicted distribution of the resource into the machine learning model.

6. The method of claim 1, further comprising:
    feeding a predetermined distribution of the resource into the machine learning model.

7. The method of claim 1, wherein the predicting of the distribution of the resource includes predicting a usage of at least one of the privacy budget parameter and the probability parameter of the differentially private system.

8. The method of claim 1, the training of the machine learning model includes training the machine learning model based on one or more of an error tolerance level, an operation priority, and a query sensitivity from the usage log.

9. The method of claim 1, further comprising:
    the training of the machine learning model includes training the machine learning model based on the predicted distribution of the resource.

10. The method of claim 1, wherein the predicting of the distribution of the resource includes predicting the distribution of the resource based on the aggregated attributes or a predetermined set of attributes.

11. A secure computation and communication system, the system comprising:
a memory to store a usage log of a differentially private system, the usage log including operation information of the differentially private system, the differentially private system having a privacy budget parameter indicative of a strength of a data privacy protection and a probability parameter indicative of a data privacy loss, the usage log having a plurality of attributes;
a processor to:
aggregate the attributes for a predetermined period of time, the privacy budget parameter and the probability parameter forming at least a part of the attributes;
generate a windowed moving aggregation based on the aggregated attributes;
train a machine learning model based on the aggregated attributes and the windowed moving aggregation to minimize an overall error of an attribute of the attributes;
predict a distribution of a resource of the differentially private system using the trained machine learning model; and
allocate the resource based on the predicted distribution.

12. The system of claim 11, wherein the processor is to further:
predict the distribution of the resource for a user, a group of users, or a department having a plurality of groups.

13. The system of claim 11, wherein the processor is to further:
predict the distribution of the resource for a query of a user.

14. The system of claim 11, wherein the machine learning model is a single target regression model or a multi-target regression model.

15. The system of claim 11, wherein the processor is to further:
feed the predicted distribution of the resource into the machine learning model; or
feed a predetermined distribution of the resource into the machine learning model.

16. A non-transitory computer-readable medium having computer-executable instructions stored thereon that, upon execution, cause one or more processors to perform operations comprising:
providing a usage log including operation information of the differentially private system, the differentially private system having a privacy budget parameter indicative of a strength of a data privacy protection and a probability parameter indicative of a data privacy loss;
aggregating attributes from the usage log of a differentially private system for a predetermined period of time, the privacy budget parameter and the probability parameter forming at least a part of the attributes;
generating a windowed moving aggregation based on the aggregated attributes;
training a machine learning model based on the aggregated attributes and the windowed moving aggregation to minimize an overall error of an attribute of the attributes;
predicting a distribution of a resource of the differentially private system using the trained machine learning model; and
allocating the resource based on the predicted distribution.

17. The computer-readable medium of claim 16, wherein the predicting of the distribution includes predicting the distribution of the resource for a user, a group of users, or a department having a plurality of groups.

18. The computer-readable medium of claim 16, wherein the predicting of the distribution includes predicting the distribution of the resource for a query of a user.

19. The computer-readable medium of claim 16, wherein the machine learning model is a single target regression model or a multi-target regression model.

20. The computer-readable medium of claim 16, wherein the operations further comprise:
feeding the predicted distribution of the resource into the machine learning model; or
feeding a predetermined distribution of the resource into the machine learning model.

* * * * *